Patented Nov. 8, 1938

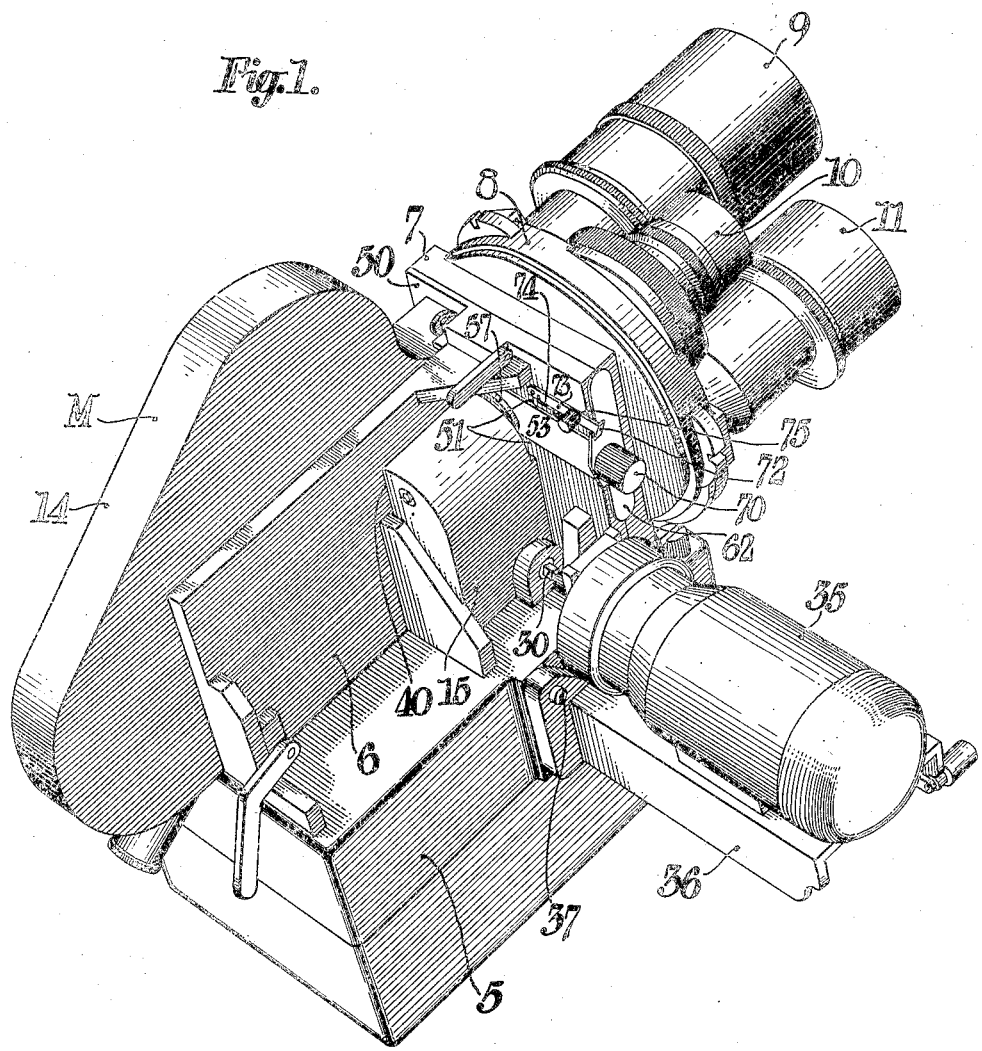

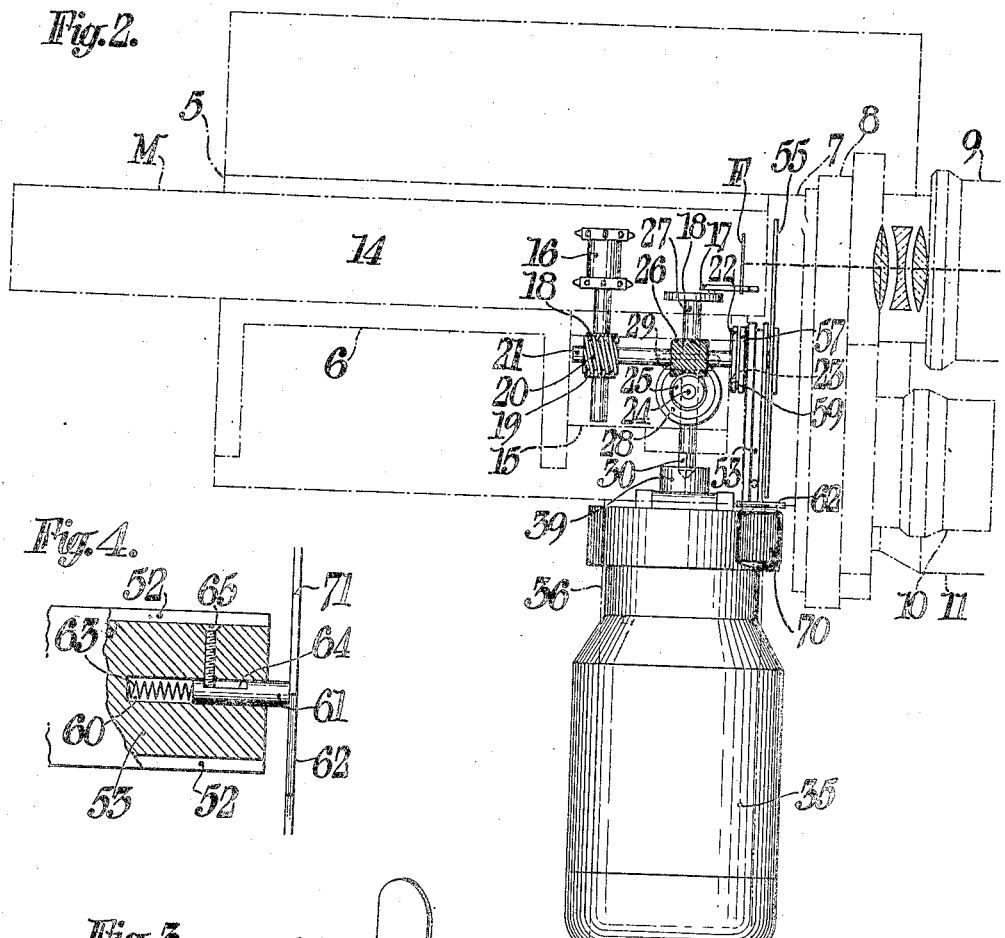
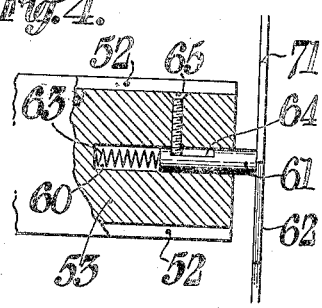
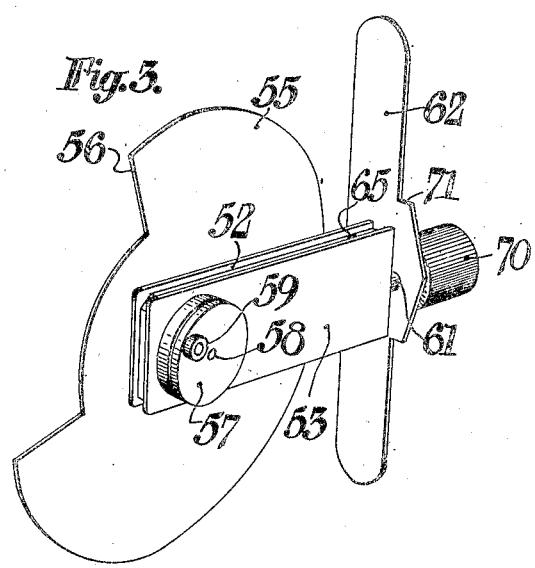

2,135,993

UNITED STATES PATENT OFFICE 2,135,993

INTERCHANGEABLE SHUTTER ASSEMBLAGE FOR MOTION PICTURE APPARATUS

Raymond W. Wengel, Rochester, N. Y., assignor, by mesne assignments, to Eastman Kodak Company, Jersey City, N. J., a corporation of New Jersey Application August 11, 1936, Serial No. 95,362

16 Claims. (Cl. 88—19.3)

This invention relates to photography, and particularly to interchangeable shutter mechanisms, each of which have different angular shutter openings; said shutter mechanisms being adapted to be interchanged with one another in operative position on a motion picture camera in order to satisfy varying exposure conditions.

In photographing the finish of a race, a motion picture camera is required to stop the motion of the contestants right at the finish line in order to give a clear and distinct picture instead of a blurred one. By way of illustration, the photographing of a horse race will be considered. Considering that a horse will travel 40 miles per hour, or 60 feet per second; if a camera operating at 100 frames per second and having a double frame pull-down stroke were used to film such a race, and the shutter of the camera had a 180 degree opening, the motion in each picture frame would be equal to 7.2 inches and the entries would appear blurred. If the shutter opening were cut down to 90 degrees, the motion in each picture frame would be cut to 3.6 inches, a 45 degree opening would give a 1.8 inch motion, and a 22½ degree opening would cut the motion to .9 inch per picture frame. From tests it has been shown that a shutter opening of 90 degrees or less will stop the motion in each picture frame to a point where the object being photographed will be distinct and free enough from motion to give a clear picture. It is obvious to one skilled in the art that the motion in each picture frame can also be controlled by cutting down the diaphragm aperture in the lens, but this method is limited by the prevailing light conditions at the time of exposure. Therefore in order to properly photograph the finish of a race in changing light conditions, it has been found desirable to control the exposure thereof by means of a combined variation in the shutter opening and the diaphragm aperture. It will also be obvious to one skilled in the art, that the motion of fast moving objects can be stopped in each picture frame by increasing the speed of the camera alone, or increasing the speed in combination with the variations in the shutter opening and the diaphragm aperture, but for the purposes of photographing a horse race, as is used in the illustration, I have found it most desirable to run the camera at a speed between 100 and 150 frames per second, and stop the motion of the contestants by varying the shutter opening and the diaphragm aperture.

The prior art shows motion picture apparatus provided with shutters having adjustable blades whereby the angular shutter openings can be varied for the purpose of controlling the degree of light projected upon a screen for controlling flicker, to effect dissolves, etc. Shutters of this nature in the prior art all show shutters wherein the individual blades are adjustably mounted relative to one another so that they can be moved angularly with respect to each other to give the desired shutter opening, and in most cases means are provided for locking the blades in their adjusted positions. A shutter having adjustable individual blades for varying the shutter opening may work satisfactorily at normal speeds of operation i. e. 16, 24, 32, frames per second, but it stands to reason that when a shutter of this type is stepped up to 100 or 150 frames per second, the individual blades are going to have a strong tendency to move from their adjusted positions due to the increased centrifugal force to which they are subjected at such speeds. It is also mandatory that a shutter operating at 100 to 150 frames per second be perfectly balanced to avoid vibration, and a shutter having individualy adjustable blades is bound to be out of balance in some of its positions of adjustment. It is a rather difficult and painstaking job to adjust a shutter having individually adjustable blades to a critical opening, and in a motion picture camera of the type described, no loss of time can be tolerated in critically adjusting the shutter opening to account for varying light changes at the finish of a race.

Therefore, one object of my invention is to provide a series of interchangeable shutter assemblages adapted for use on a motion picture camera, the shutters on each of said assemblages having different critically adjusted angular shutter openings.

Another object is to provide a shutter assemblage which is adapted to be slid into operative position in a motion picture camera or be removed therefrom rapidly and simply.

And still another object is to provide an interchangeable shutter assemblage for a motion picture camera, the shutter of which is adapted to automatically engage a motor driving means therefor when the shutter assemblage is inserted into place in the camera.

And still another object is to provide an interchangeable shutter assemblage wherein the shutter thereon is driven by the gearing driving the film feeding mechanism of the camera on which it is to be used.

Another object is to provide an interchangeable shutter assemblage which is provided with a latch member adapted to engage the cooperating latch member on the camera for locking the assemblage in operative position thereon, said latch member on the asemblage also providing a light lock to prevent light from entering the camera at the point of junction between the camera and the shutter assemblage.

Briefly, my invention comprises a given shutter and its driving gear both mounted on a slide member which is adapted to slidably engage a guide plate in a motion picture camera so that a given shutter can be easily and rapidly removed from the guide plate to be replaced by a shutter having a different opening. The forward end of the slide member is provided with a plate which serves as a light lock, and the shutter assemblages is held in position on the guide plate by having a spring pressed hook member, which is fastened thereto, adapted to engage one edge of the light lock. A spring pressing means is incorporated in the slide member to tightly hold it against the hook member when it is in a locking position, and to also automatically throw the shutter assemblage out of operative position when the hook member is raised to an unlocking position.

The novel features that I consider characteristic of my invention are set forth with particularity in the appended claims. The invention itself, however, both as to its organization and its methods of operation, together with additional objects and advantages thereof will best be understood from the following description of specific embodiments when read in conjunction with the accompanying drawings in which, Figure 1 is a perspective view of a motion picture camera, and showing a preferred embodiment of my novel shutter assemblage locked in operative position thereon, Figure 2 is a skeleton plan view of the camera shown in Figure 1, with certain parts omitted to clearly show the association of the driving means for the film feeding mechanism and the driving means for the shutter, Figure 3 is a perspective view of my novel interchangeable shutter assemblage, and Figure 4 is a detailed section of the slide carrier of the shutter assemblage, and showing the built-in spring pressing means acting on the plate thereof, said plate serving as a light lock as well as a latch member.

Like reference characters denote corresponding parts in the several figures.

Referring now particularly to Figure 1, wherein a preferred embodiment of my invention is illustrated, a camera is shown comprising a base 5 the top of which is divided into sections by means of a partition 6. On the top of the base 5 and at the forward end thereof is provided a turret plate 7 which extends vertically from the base 5, said turret plate being fixed to the base 5 in any suitable manner or being cast integral therewith. A lens turret 8 having a plurality of lenses 9, 10, and 11, all of different focal length, mounted thereon in any suitable manner, is rotatably mounted on the turret plate 7 in such a way that any one of the lenses 9, 10, or 11, can be brought into alignment with an exposure aperture in the turret plate 7, not shown, whereby an image formed by one of said lenses will be impinged upon the film strip F, see Figure 2.

The film magazine M is adapted to constitute a motion picture camera with the exception that no source of power is provided for driving a film advancing means contained therein, and no lens is positioned in front of its exposure aperture.

Inasmuch as the construction of the magazine is not pertinent to the present invention, only the gearing for the film advancing mechanism contained therein will be described. Referring now particularly to Figure 2 wherein the gearing for transmitting power to the film advancing mechanism of the magazine M, and for driving my novel shutter is shown, the magazine M is shown as comprising a film chamber 14 and a gear box 15, said gear box projecting from the side of the film chamber 14. The film F, indicated in Figure 2, wherein it is shown positioned in an imaginary film gate of the magazine, is adapted to be drawn from and fed to a supply and takeup reel respectively not shown, which are mounted in the magazine, by means of a sprocket 16. The film is advanced intermittently through a film gate and past an exposure aperture in the magazine by means of a pull-down claw 17 which is operated by an eccentric 18 in the usual manner. The sprocket 16 is mounted on a shaft 18 extending into the gear box 15, said shaft 18 being provided with a spiral gear 19. Gear 19 is in engagement with another spiral gear 20 which is fixed to the shutter shaft 21 extending transversely of the gear box 15 near the top thereof. Shaft 21 is adapted to extend through the end of the gear box 15, and on the end of said shaft is fixed a shutter driving disk 22 which is provided with a radial slot 23 the purpose of which will be described hereinafter. Shaft 21 is driven from shaft 24, which extends vertically of the gear box 15, through the engagement of a spiral gear 25 and a spiral gear 26 fixed to shaft 21. Vertical shaft 24 is in turn driven from shaft 27 through the engagement of the bevel gear 28 fixed to the end of shaft 24, and bevel gear 29 fixed to the shaft 27. One end of the shaft 27 is directly connected to the eccentric 18 driving the pull-down claw 17 while the other end of the shaft is adapted to extend outside of said gear box 15, see Figure 1, and be milled to a square section, indicated at 30, to provide a connection for engaging a source of power as described hereinafter.

A driving motor 35 is suitably mounted on a supporting bracket 36 which is in turn fixed to the base 5 by means of bolts 37. The driving motor 35 is provided with a coupling 39 into which the square end 30 of the shaft 27 is adapted to project to form a driving connection therewith when the magazine M is properly positioned on the base 5, so that the exposure aperture and its gate is on the optical axis of the lens of the turret which is in picture-taking position, and the gear box 15 associated with the magazine projects through an aperture 40 in the partition 6. The associated gearing contained in the gear box 15 for driving the sprocket 16, the pull-down 17, and the shutter driving disk 22 are of such a ratio that the speeds of the several individual parts are properly related so as to insure proper picture taking.

A guide plate 50 is fixed to the rear face of the turret plate 7 in any suitable manner, said guide plate having an aperture not shown, which is in alignment with the exposure aperture of the turret plate 7 and the exposure aperture in the film gate in the magazine M whereby light transmitted by one of the lenses, 9, 10, or 11, which is in picture taking position, will not be obstructed thereby from striking the film strip F. The guide plate 50 is provided with a pair of spaced guide rails 51 which are adapted to be engaged by guiding groove 52 around the edge of the carrier slide 53 when the shutter assemblage, see Figure 3, is mounted on the camera.

A shutter blade 55 having a given angular shutter opening 56 is fixed to one end of a pin 58, said pin extending through and being rotatable with respect to the carrier slide 53. The shutter blade 55 is adapted to be driven by the driving wheel 57 which is fixed to the other end of a pin 58 and is located on the opposite side of the carrier slide 53. A driving pin 59, eccentrically mounted on the driving wheel 57, is adapted to engage the radial slot 23 in the driving disk 22 fixed to the shutter shaft 21 when the carrier slide 23 is properly positioned in the guide plate 50 in which position the shutter blade 55 intercepts the light rays passing through the lens to the film strip, see Figure 2, and, therefore, forms a driving coupling between the motor 35 and the shutter blade 55. The end of the carrier slide 53, opposite the end thereof on which the shutter blade 55 is mounted, is provided with a recess 60 into which a stub shaft 61, on the end of which an elongated plate 62 is fastened, is adapted to slide. A spring 63 is seated in the recess 60 behind the stub shaft 61, and tends to normally force the plate 62 away from the slide carrier 53. In order to prevent the spring 63 from forcing the stub shaft 61 completely out of the recess 60, the shaft is provided with a cut-out portion 64 into which a screw 65 is adapted to extend, said screw being located in the guiding groove 52 of the carrier 53 and adapted to be screwed down flush with the base thereof so that it offers no resistance to a smooth engagement between the guide rails 51 of the camera and the guiding groove of the slide carrier.

Plate 62 serves as a light lock for the shutter assemblage, and also serves as a latch member for locking the shutter assemblage in operative position on the camera. In order to lock the shutter assemblage in the camera, the slide carrier 53 is slid into the guide plate until the driving pin 59 engages the radial slot 23 in the driving disk 22 on the shutter shaft 21 at which point it is stopped. The plate 62 which is provided with a handle 70, and which is normally spring pressed away from the end of the slide carrier 53, see Figure 4, is then pressed inwardly against the spring 63 until a latch portion 71 thereon, see Figure 3, is engaged by a hooked portion 72 on the end of a lever 73, the end of which is pivotally pinned to the base of the guide plate 50. The lever 73 is normally spring pressed into locking position by means of a spring 74, and the face of the hooked member 72 thereon is inclined in such a way that when the plate 62 is forced into locking position, the lever 73 is thrown up automatically by the pressure of contact between the hooked member and the plate 62, and a locking of the plate is effected. In order to release the shutter assemblage from the camera, the lever 73 has to be manually raised by gripping a knob 75 fixed thereon, whereupon the spring 63 which constantly acts against the plate 62 in its locked position will automatically force said plate away from the slide carrier 53, said carrier 53 being carried along to a certain extent due to the momentum of the plate 62.

From the above description, it can be readily understood that by providing a plurality of separate individual shutter assemblages, as shown in Figure 3, each having a shutter with a different given angular shutter opening, said shutters can be interchanged on a motion picture camera in a rapid and easy manner to correct the exposure for varying light conditions and speeds of objects being photographed. Although I have shown and described my novel interchangeable shutter assemblage in connection with a high speed camera for taking pictures of fast moving objects, it is to be understood that any cinematographic apparatus wherein the shutter is adapted for varying the opening therein could be readily adapted to the use of interchangeable shutter assemblages as described; the shutter of each of said shutter assemblages having different shutter openings to satisfy all requirements which might be encountered.

It can also be readily understood from the above description that my novel type of interchangeable shutter assemblage lends itself to a camera wherein all movable parts are readily removed from the base. When photographing the finish of a race, it is absolutely essential that the optical axis of the camera be accurately positioned to include the finish line entirely across the race track. Therefore, a camera designed along the lines of the one used for illustrative purposes and shown in the drawings, is particularly adapted for this use because the support 5 including only the lens turret plate 7 and the partition 6 can be definitely fixed on a support after alignment by means of surveying instruments, and the magazine M with its associated gear box 15, the motor 35, and the shutter assemblage, see Figure 3, can be removably attached thereto at will. Any breakdown in a mechanism of the type described is bound to occur in a movable part, and since this apparatus is designed so that all movable parts are capable of being removed from the camera base 5, all repairs can be made without disturbing the adjustment of the optical axis of the camera with respect to the finish line of the race track. My novel shutter assemblage lends itself to this apparatus inasmuch as it provides for rapidly and easily interchanging shutters on such a camera for varying exposure conditions without causing a misalignment in the camera base and its associated turret plate.

Although I have shown and described certain specific embodiments of my invention, I am fully aware that many modifications thereof are possible. My invention, therefore, is not to be restricted except in so far as is necessitated by the prior art and the spirit of the appended claims.

Having thus described my invention, what I claim as new and desire to secure by Letters Patent is:

1. In a motion picture apparatus, a support, spaced guide rails carried by the support adapted to receive a shutter assemblage as a unit, a radially slotted disk carried by the support adjacent said guide rails and adapted to engage and drive said shutter assemblage, means for driving said radially slotted disc, and a latch element carried by the support adjacent said guideway adapted to retain the shutter assemblage on the guide rails in a position to be driven by the radially slotted disk.

2. In a motion picture apparatus, a support, spaced guide rails carried by the support adapted to receive a shutter assemblage as a unit, a radially slotted disk carried by the support adjacent said guide rails and adapted to engage and drive said shutter assemblage, means for driving said radially slotted disk, and a spring pressed hook member pivotally mounted on said support adjacent said guide rail adapted to engage and retain the shutter assemblage on the guide rails in a position to be driven by the radially slotted disk.

3. In a motion picture apparatus, a shutter assemblage, adapted to be removably attached to a support including guide rails, a driving member, and a latch element, and comprising a carrier, means for holding the carrier in the guide rails of the support, a shutter blade rotatably mounted on the carrier, a shaft carrying said shutter blade, a driving disk mounted on said shaft, said driving disk being adapted to be engaged and driven by the driving member when said carrier is positioned on the support by said guide rails.

4. In a motion picture apparatus, a shutter assemblage, adapted to be removably attached to a support including guide rails and a driving member, and a latch member, and comprising a carrier, means for holding the carrier in the guide rails of the support, a shutter blade rotatably mounted on the carrier, a shaft carrying said shutter blade, a driving disk on said shaft, a light lock adapted to serve as a lock element, said driving disk being adapted to be engaged and driven by the driving member when said carrier is positioned by the guide rails and when the carrier is latched to said support.

5. In a motion picture apparatus, a shutter assemblage, adapted to be removably attached to a support including guide rails, a driving member, and a latch member, and comprising a carrier, means for holding the carrier in the guide rails of the support, a shutter blade rotatably mounted on the carrier, a shaft carrying said shutter blade, a driving disk on said shaft, a grip for said shutter assemblage adapted to be slidably mounted in a limited path in the carrier, a light lock on said grip adapted to serve as a latch element, spring pressing means normally forcing said grip and the light lock away from said carrier, said driving disk being adapted to be engaged and driven by the driving member when said carrier is positioned by the guide rails and is latched in said support.

6. In a motion picture apparatus, a shutter assemblage, adapted to be removably attached to a support including guide rails, a radially slotted driving member, and a latch member, and comprising a carrier, means for holding said carrier in the guide rails of the support, a shutter blade rotatably mounted on the carrier, a shaft carrying said shutter blade, a driving disk on said shaft, a pin eccentrically mounted on said driving disk adapted to fit into the radial slot in said radially slotted driving member, a light lock adapted to serve as a latch element, said driving disk being adapted to be engaged and be driven by the radially slotted driving member when said carrier is positioned in said guide rails.

7. In a motion picture apparatus, a shutter assemblage adapted to be removably attached to a support including guide rails, a driving member, and a latch member, and comprising a carrier, a shutter blade rotatably mounted on the carrier, a shaft carrying the shutter blade, a driving disk on said shaft, a grip for said shutter assemblage adapted to extend into a recess in said carrier, said grip provided with a slot, a pin on said carrier adapted to extend into said slot to limit movement of said grip in said carrier, and a light lock on said grip adapted to serve as a latch element, said driving member being adapted to be engaged and be driven by the driving member when said carrier is positioned in the guide rails and latched in said support.

8. In a motion picture apparatus the combination of a shutter assemblage including a stationary carrier, a shutter rotatably mounted on said carrier, a driving connection for said shutter mounted on said carrier, and a support provided with a guideway into which said carrier is adapted to slide, a shutter driving means on said support adapted to be engaged by said driving connection when said shutter assemblage is slid into said guideway, and a releasable locking means on said support adapted to engage and hold said carrier in operative position in said support.

9. In a motion picture apparatus the combination with a support provided with a guideway, an objective on said support, means for feeding a film strip past said objective, a shutter driving means on said support, suitable means adapted to drive said film feeding means and said shutter driving means, of a shutter assemblage comprising a stationary carrier adapted to fit into the guideway in said support, a shutter blade rotatably mounted on said carrier, a driving connection on said shutter adapted to engage said shutter driving means when the shutter assemblage is positioned in the guideway, and means on said support for releasably locking said assemblage in operative position in the guideway.

10. In a motion picture apparatus the combination with a support provided with a guideway, an objective on said support, means for feeding a film strip past said objective, a shutter driving means on said support adapted to be driven by said film feeding means, of a shutter assemblage comprising a stationary carrier adapted to fit into the guideway of said support, a shutter blade rotatably mounted on said carrier, a driving connection on said shutter adapted to engage said shutter driving means when the shutter assemblage is positioned in the guideway, and means for releasably locking said assemblage in operative position in the guideway said means including a spring pressed hook pivoted on the support, and a latch member on the carrier to be engaged by said hook.

11. In a motion picture apparatus the combination with a support provided with a guideway, an objective on said support, means for feeding a film strip past said objective, a shutter driving means on said support including a radially slotted disk, a motor adapted to drive said film feeding means and said shutter driving means, of a shutter assemblage comprising a carrier adapted to fit into the guideway in said support, a shutter blade rotatably mounted on said carrier, a driving disk fixed to said shutter, and a pin on said driving disk adapted to engage the radially slotted disk when said shutter assemblage is fitted into the guideway in the support.

12. In a motion picture apparatus the combination with a support provided with a guideway, an objective on said support, means for feeding a film strip past said objective, a latch member on said support, of a shutter assemblage comprising a carrier adapted to fit into said guideway, a shutter blade rotatably mounted on said carrier, a shaft carrying said shutter blade, a driving disk fixed to said shaft, a light lock slidably mounted on said carrier and adapted to serve as a latch element, said driving disk being adapted to be engaged and driven by said driving means when said carrier is positioned and latched in the guideway, and resilient means normally forcing said light lock away from said carrier.

13. In a motion picture apparatus the combination with a support provided with a guideway, an objective on said support, means for feeding a film strip past said objective, a latch member on said support, a radially slotted disc adjacent said guideway and adapted to be geared to the film feeding means, of a shutter assemblage comprising a carrier adapted to fit into said guideway, a shutter blade rotatably mounted on said carrier, a shaft carrying said shutter blade, a driving disk fixed to said shaft, said driving disk being adapted to be engaged and be driven by said radially slotted disc when said carrier is positioned in the guideway, a grip adapted to extend into and be slidable within a recess in said carrier, said grip provided with a slot, a pin on said carrier extending into the slot to limit the sliding movement of the grip in the recess, a light lock fixed to said grip and adapted to serve as a latch element in conjunction with said latch member on the support when said shutter assemblage is inserted into said guideway on the support, and a spring pressing means normally forcing said grip and light lock away from said carrier.

14. In a motion picture camera the combination of a shutter assemblage comprising a stationary carrier, a shutter rotatably mounted on said carrier whereby the plane of the shutter is parallel to the plane of the carrier, a driving connection for said shutter mounted on the carrier, the camera provided with a guideway into which the carrier is adapted to slide so as to position the shutter between the objective and the film strip, and a shutter driving means on said camera adapted to be engaged by said driving connection on the carrier when the carrier is slid into the guideway.

15. In a motion picture camera the combination with a support provided with a guideway, an objective on said support on one side of said guideway, means for feeding a film strip past said objective, and located on the support on the opposite side of the guideway relative to said objective, a shutter driving means on said support, of a shutter assemblage comprising a stationary carrier adapted to slide into the guideway whereby the plane of the carrier is parallel to the plane of the film strip, a shutter blade rotatably mounted on said carrier in a plane parallel thereto and adapted to lie between the objective and the film strip when the carrier is in position on the support to interrupt the light passing through the objective to the film strip, and a driving connection on said shutter adapted to engage said shutter driving means when the shutter assemblage is positioned in the guideway.

16. In a motion picture camera the combination with a support provided with a guideway, an objective on said support on one side of said guideway, means for feeding a film strip past said objective, and located on the support on the opposite side of the guideway relative to said objective, a shutter driving means on said support, of a shutter assemblage comprising a stationary carrier adapted to slide into the guideway whereby the plane of the carrier is parallel to the plane of the film strip, a shutter blade rotatably mounted on said carrier in a plane parallel thereto and adapted to lie between the objective and the film strip when the carrier is in position on the support to interrupt the light passing through the objective to the film strip, a driving connection on said shutter adapted to engage said shutter driving means when the shutter assemblage is positioned in the guideway, and cooperating means on the support and the carrier for releasably locking said assemblage in operative position in the guideway.

RAYMOND W. WENGEL.